Patented Dec. 11, 1951

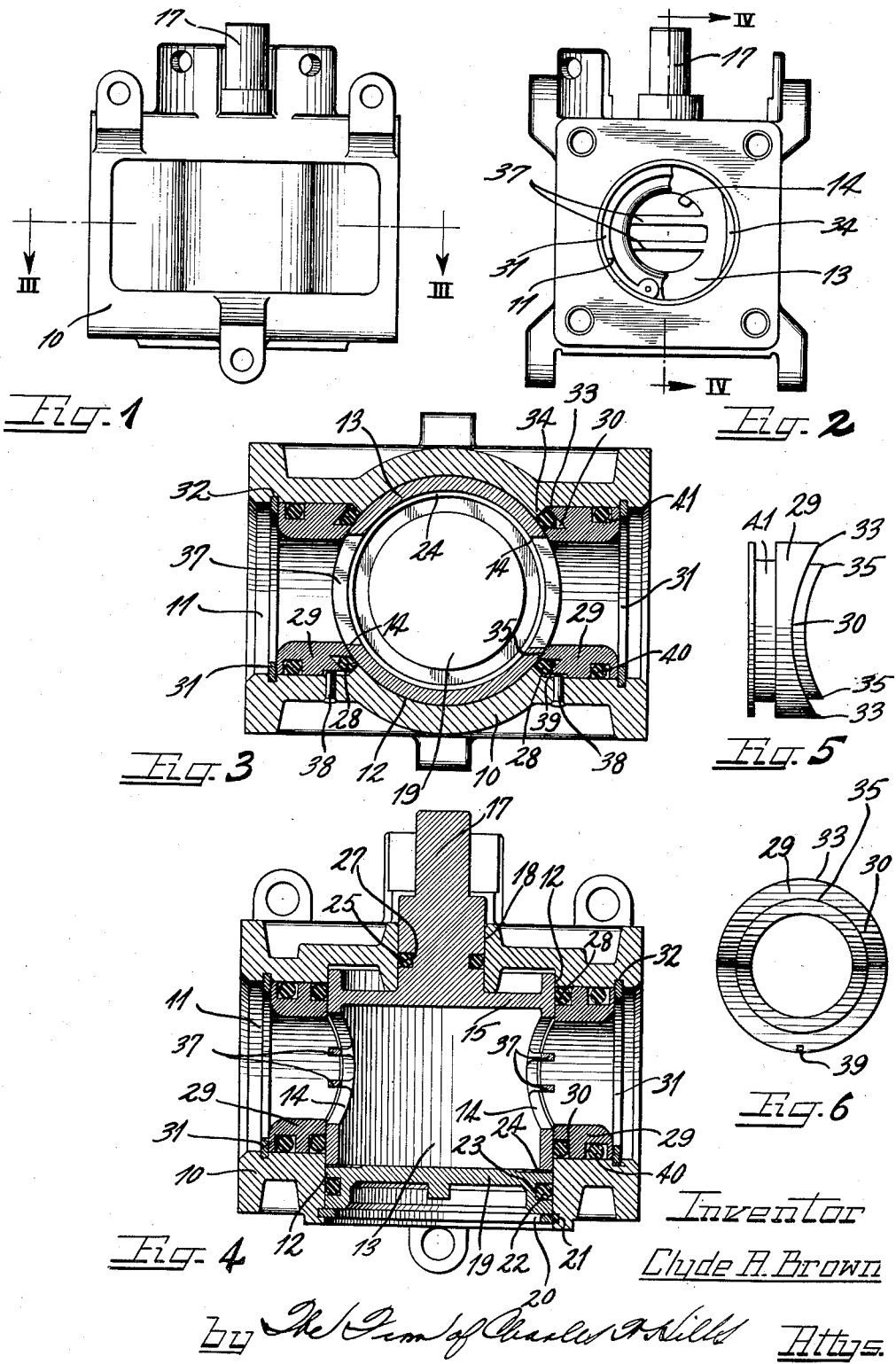

2,578,396

UNITED STATES PATENT OFFICE 2,578,396

VALVE AND SEALING STRUCTURE THEREFOR

Clyde A. Brown, Chicago, Ill., assignor to The Dole Valve Company, Chicago, Ill., a corporation of Illinois Application October 12, 1945, Serial No. 621,876

16 Claims. (Cl. 251—103)

This invention relates to improvements in valves and more especially to valves of this kind which are adapted to handle fluids under pressure or volatile liquids so that a thoroughly sealed relationship is required between the relatively movable parts in order to prevent leakage.

In a valve device wherein a movable flow controlling shut-off member such as a rotor is operative within a valve casing having ports registrable with ports in the rotor for passage of a fluid under pressure or a volatile liquid, a special problem is presented by the need for effecting a fluid seal which will prevent escape of the fluid from the ports past the rotor. Complicating the problem is the tendency of any of the desirable sealing mediums, which are usually of a pressure deformable nature, to expand or otherwise shift toward or into a port opening upon turning of the rotor, and consequent passage of the sealing means across a port opening, so that in the immediate port area the sealing means is released from sealing engagement with the surface against which it normally engages in its sealing function.

An important object of the present invention is to provide a new and improved sealed valve construction especially adapted for handling fluids under pressure or volatile liquids.

Another object of the invention is to provide novel means in a high pressure valve for sealing against fluid leakage to and between moving parts having fluid passages or ports therein.

A further object of the invention is to provide improved means for retaining pressure-tight sealing means from escaping or protruding into the port of a relatively movable valve member in the course of such relative movement as causes the sealing means to extend across the port.

Still another object of the invention is to provide for effecting a more perfect seal in a high pressure type of valve.

It is a further object of the invention to make improved use of a resilient type of sealing medium.

In accordance with the general features of the present invention there is provided a valve structure which comprises a main casing or housing which is ported for fluid passage, a control member cooperatively related to the ported structure for controlling the flow of fluid through the port or ports therein, sealing means to prevent leakage of fluid between the control member and the structure from around the ported areas thereof, and means for preventing escape or obstructive projection of the sealing medium into the ported area upon relative movement of said control member and said structure.

Other objects, features and advantages of the present invention will become apparent from the following description of a preferred embodiment thereof and from the accompanying one sheet of drawings, in which:

Figure 1 is a side elevational view of a valve device embodying the features of the invention;

Figure 2 is an end view of the valve device looking toward the left of the device as shown in Figure 1;

Figure 3 is a horizontal sectional view through the valve device taken substantially in the plane of line III—III of Figure 1;

Figure 4 is a vertical sectional view taken substantially in the plane of line IV—IV of Figure 2;

Figure 5 is a side elevational view of a sealing retainer used in the present valve device; and Figure 6 is a face elevational view of the sealing retainer.

Although it will be obvious that the invention, at least with respect to certain desirable features thereof, is not restricted to use or incorporation in a rotary type of valve, it is herein for illustrative purposes shown as embodied in a valve of this type which has been found to be highly practical and useful in connection with the control of fuel in aircraft or the like. A valve device of this character may, as shown, comprise a more or less elongated casing or housing structure 10 providing a longitudinal fluid passage 11 therethrough which is perpendicularly intersected by a round bore 12 within which a cylindrical control member, or rotor plug 13 is rotatably mounted. The valve housing 10 may conveniently be formed as a one-piece casting and, from the nature of the use to which the device is to be put, the cooperating surfaces of the bore 12 and rotor 13 may be accurately machined for a close sliding fit. One end of the rotor bore 12 is closed while the other end is open to receive the rotor 13 in assembling the device. For economy in weight, the valve rotor 13 may be formed as a hollow cylinder or barrel with diametrically opposite ports 14 communicating with the interior and adapted to register with the fluid passage 11.

At one end, the valve rotor 13 is formed with a head 15 from which extends an axial stem 17 projecting through a journal bore 18 formed coaxially in the closed end of the rotor bore 12. The stem 17 is adapted to be connected to an operating device (not shown) by which rotation of the valve rotor 13 is effected for opening and closing the fluid passage 11 by respectively turning the rotor ports 14 into or out of registration with the fluid passage. For convenience in manufacture of the valve rotor 13 it may be left open at the end opposite the head 15 and such open end is closed in assembly by means of a closure disk 19 fitting relatively closely within the open end of the barrel bore 12 and slidably opposing the end of the barrel. The closure disk may be held in place by means such as a snap ring 20 which is seated within a groove 21 provided therefor in the outer end portion of the bore 12.

In use of the valve for controlling the flow of a fluid such as gasoline or the like which is highly volatile so that escaping fumes would create a dangerous condition in the vicinity of the escape, it is highly important that adequate sealing means be provided between all moving parts from between which the fluid or volatile constituents thereof might escape. Accordingly, means such as a sealing ring 22 is disposed within an annular groove 23 in the edge of the closure disk 19 to engage sealingly with the opposed surface of the bore 12. A thrust bearing such as an annular washer 24 between the edge of the barrel 13 and the opposing face of the closure disk 19 facilitates turning of the rotor 13. To effect a seal between the operating stem 17 and its bearing bore 18, means such as a sealing ring 25 is mounted within an annular groove 27 in the stem and engages sealingly against the opposing surface of the bore. Both the sealing ring 22 and the sealing ring 25 may be what are sometimes referred to as O rings. Such rings are preferably of round cross section and formed from a resilient material such as rubber or a suitable rubber substitute. They are especially durable and efficient because they are inherently tough, wear-resistant and susceptible to compression without damaging deformation but actually improved sealing efficiency. Another important characteristic of this type of sealing ring is that under the influence of fluid pressure working thereagainst in the confinement of the retaining groove and the opposing surface against which the seal is to be maintained, the sealing ring tends to spread into even more thorough sealing interengagement with the contacted surfaces.

According to the invention, an improved sealing arrangement is provided at the juncture of the rotor 13 and the body 10 within the flow passage 11, such means being especially characterized by a relationship to the rotor ports 14 which prevents any obstructive protrusion of the sealing medium under compression into the ports on passing thereby in the rotation of rotor. To this end, the internal diameter of the fluid passage 11 is formed initially greater than the diameter of the ports 14 whereby a suitable sealing medium such as a pressure deformable sealing ring 28 of appropriate diameter, and preferably of the O-ring type previously described, and a rigid annular retaining member or ring 29 can be accommodated in the corner defined by juncture of the wall of the rotor 13 adjacent to each of the ports 14 with the contiguous wall of the fluid passage 11. Each of the coaxial sealing rings 28 and companion retaining ring 29 is preferably identical and interchangeable, so that a description of one will suffice for the other.

A close, though not necessarily bearing relationship is provided for between the inner edge of the retaining ring 29 and the contiguous wall of the rotor 13. Therefore, since the axis of the retaining ring 29 is perpendicular to the axis of the rotor 13, and the surface of the rotor is cylindrical, the rotor-opposing edge of the retaining ring is formed concave, as seen in Figs. 3 and 5, in general conformity to the chordal segment of the portion of the rotor opposed thereby.

To accommodate the sealing ring 28 and hold it in the angle or reentrant corner defined by the rotor 13 and the wall of the fluid passage 11, the retaining ring 29 is formed with a groove 30. This groove is preferably formed throughout of a uniform depth and width so related to the diameter of the sealing ring 28 that the periphery of the sealing ring projects beyond the rotor-opposing end and preferably also the perimeter of the retaining ring 29. As a result, the sealing ring enters into sealing engagement against the contiguous surfaces of the flow passage 11 and the rotor 13 when the inner end or edge of the retaining ring is urged toward the rotor 13. Means for maintaining the retaining ring 29 in the sealing relation to the rotor may comprise a flat snap-ring 31 engaged within a groove 32 provided therefor in the wall of the passage 11.

By having the axially facing wall of the sealing ring groove 30 contoured substantially parallel to the adjacent end or edge of the retaining ring, that is, conforming to the cylindrical surface of the plug 13, while at the same time having the concentric wall of the groove uniformly cylindrical, confining lips 33 are provided at the opposite chordal or protruding sides or ends of the concavity in the edge of the retaining ring (Figs. 3 and 5). These lips 33 cooperate with integral ledges 34 formed at the diametrically opposite sides of the fluid passageway 11 which lie furthest inwardly contiguous to the valve rotor 13 (Figs. 2 and 3). By preference, the ledges 34 lie in respective planes that are radial to the rotor 13 and thus cooperate with the lips 33 and similar inner lips 35 on the end of the retaining ring to place the sealing ring 28 under sealing compression but confined against leaving the groove 30 except to protrude to an extent just sufficient to effect a thorough sealing engagement with the contiguous surface of the rotor 13. As a result, when the rotor 13 is turned so that the ports 14 pass the sealing ring 28, the sealing ring is held against leaving the groove 30 and protruding beyond the normal extent desirable for effecting a sealing engagement. Hence the edges of the ports 14 will not engage or catch on the sealing ring and obstruct free rotation of the rotor and damage the sealing ring, as might otherwise be the case. It may be noted that in the chordal portions of the retaining ring 29 between the lips 33 and 35, the groove 30 is of substantially wedge-shape cross section. In those portions of the groove 30 ninety degrees removed from the lips 33 and 35, a substantially rectangular cross section is adequate (Fig. 4) because there the sealing ring remains in constant contact with the plug 13 in any rotary position of the latter.

Additional protective confinement of the sealing ring 28 within its groove while a port 14 passes the same, is attained by providing each of the ports 14 with cross bars 37, herein shown as two spaced parallel bars forming a protective grid across each port and extending in the direction of rotation of the rotor.

In order to hold the retaining ring 29 against rotation a locking pin 38 may be driven through the wall of the valve housing 10 and project into a locking groove or slot 39 provided for the purpose in the periphery of the ring. It may be noted that the locking groove 39 opens in an axial direction toward the inner edge of the retaining ring and preferably through one of the lips 33 so that the retaining ring may be readily assembled or disassembled by sliding it axially within the passage 11.

Additional sealing means adjacent to the outer end of the retaining ring 29 may be provided in the form of an O-ring 40 received within an annular groove 41 and uniformly engaging the inner wall or base of the groove 41 and the opposing wall of the passage 11.

From the foregoing it will be apparent that all connected or movable parts of the valve assembly are thoroughly sealed against escape of fluid from the interior of the assembly. The especially effective fluid seal provided at the corner between the valve rotor and the fluid passage of the valve housing permits the valve rotor to be rotated in either direction continuously or oscillating, and at all times the sealing medium is retained against any interference with free movement of the flow ports thereby.

It will of course be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a valve construction including relatively movable members one of which has a port opening therein and the other of which has a fluid passage with which the port is adapted to register, means for effecting a fluid seal at the juncture of said members at said fluid passage, said port being movable across said sealing means in the relative movement of said members, and means including a grid structure across said port for retaining said sealing means against obstructive projection into said port in the course of said movement of the port thereacross.

2. In combination in a valve construction of the character described comprising a member providing a fluid passageway, a control member extending across said passageway and having a fluid port adapted to register with said passageway, said members being adapted for relative movement to carry said port into and out of registry with said passageway, sealing means at the juncture between said relatively movable members, means for urging said sealing means into sealing relation to the contiguous surfaces of said members, and means including a grid structure across said port for retaining the sealing means against projection into said port upon relative movement of the members which carries the port across said sealing means.

3. In combination in a valve construction including a valve housing having a fluid passageway therein, a control member movably mounted within said housing and having a port therein registrable with said passageway, a sealing ring within said passageway at the juncture between said housing and member, means for urging said sealing ring into snug sealing engagement with the contiguous surfaces of the housing and member at said juncture, and means including structure extending across said port for holding the sealing ring against protruding into said port in the relative movement of said housing and member carrying said port across said sealing ring.

4. In combination in a valve including a housing and a control member within said housing, wherein the housing and member have registering fluid passageways and are relatively movable to carry the passageway into and out of registration, a sealing ring at the juncture between said housing and member, a retainer urging said sealing ring into sealing engagement with said housing and said member, sealing ring retaining ledges on the housing, and means on said retainer cooperative with said retaining ledges on the housing to hold said sealing ring against protrusion into a port which is moved across said sealing ring in the course of relative movement of said control member and housing.

5. In combination in a valve construction including a housing and a control rotor rotatable within said housing, said housing having a fluid passage and said rotor having a port registrable with said passage, a sealing ring engageable at the juncture of said housing and said rotor within said passage, a retaining ring secured within said passage and urging said sealing ring into sealing engagement, and means on said retaining ring and on said housing and on said rotor cooperating for retaining the sealing ring against obstructing projection into said port upon rotation of the rotor to carry the port across said sealing ring.

6. In combination in a valve construction of the character described, a valve housing, a rotor mounted within said housing, said housing having a fluid passageway, the rotor having a fluid port registrable with said passage, a sealing ring in the juncture corner between the wall of the passage and said rotor, a retaining ring secured within said passage and having a groove the walls of which engage said sealing ring and urge the same into sealing engagement, said groove walls being formed to effect uniform sealing pressure against said sealing ring throughout the entire juncture areas engaged by the sealing ring, and a retaining structure across said port for preventing entry of the ring into the port on passage of the port thereby in rotation of the rotor.

7. In combination in a valve construction of the character described, a valve housing having a fluid passage therein, a rotary control member mounted within said housing and extending on an axis at right angles to said passage, said member being adapted to block said passage but having a port therein adapted to register with the passage and being of substantially smaller diameter than the passage, a sealing ring surrounding the port and engaging within the corner defined by juncture of the member and the contiguous wall of said passage, a retaining ring secured within said passage and having a groove therein contoured to follow the contour of the plug and dimensioned to receive said sealing ring in such relation as to force the sealing ring into thorough sealing engagement within said corner, the chordal sides of said retaining ring having retaining lips and said housing having ledges cooperating with said retaining lips to retain said sealing ring against protruding into said port in the rotation of said control member to carry the port across said sealing ring.

8. In combination in a valve construction of the character described, a housing, a rotary member within said housing, said housing having a passage, said member having a port registrable with said passage but of smaller diameter, a sealing ring disposed within the corner formed by juncture of said passage and said member, a retainer for said sealing ring having a shape adjacent to said member complementary to the adjacent surface of the member and formed with a groove receptive of said sealing ring, said groove and housing having means cooperative on the line of movement of the port in said member during the rotation of the member to retain the sealing means against projection into the port.

9. In a retainer for a deformable sealing medium at the juncture between a cylindrical valve rotor having a port and a fluid passage extending perpendicularly to the rotor within a valve body and adapted to be registered with the rotor port, a ring conforming to the passage wall and having an edge conforming to the chord of the opposing portion of the rotor, said edge having a groove for the sealing medium, said groove being of substantially wedge shape cross section at the chordal sides of the ring, and means extending radially relative to the rotor from the housing and cooperating with the wedge-shaped portions of the groove for holding the sealing medium against entering the port on movement thereof across the sealing medium upon relative rotation of the rotor and the valve body.

10. A retainer as defined in claim 9 wherein the groove is of substantially rectangular cross section intermediate the chordal sides.

11. In combination in a valve construction of the character described, a structure having a fluid passage therein, a movable valve member adapted to block said passage and having a port therein for registration with the passage, sealing means for effecting a fluid-tight seal at the juncture of said structure and valve member, said structure having means holding the sealing means in sealing position, and means on the rotor extending across said port and cooperative with said holding means to engage and restrain the sealing means from entering the port on movement thereby.

12. In combination in a valve of the character described, a valve housing, a rotary control member within said housing, said housing having a fluid passage and the member having a port registrable with said passage in rotation of the member, a sealing ring disposed in the corner formed between the housing and said member, means for retaining said sealing ring, and means carried by said member for holding said sealing ring out of said port upon passage of the port past said sealing ring.

13. A valve construction as defined in claim 12 wherein the means for holding the sealing ring against entering the port comprises a pair of guard bars extending across the port.

14. A rotor for a valve of the character described wherein the rotor controls fluid flow through a passageway wherein deformable sealing means is pressed into the juncture between the rotor and the wall of the passageway, said rotor having a fluid port therein, and means providing a grid across said port and adapted to restrain the sealing means from entering the port on passage of the port thereby in rotation of the rotor to control said fluid flow.

15. In combination in a valve construction of the character described, a body having a fluid passage therethrough, a valve rotor bore intersecting said passage and being substantially closed at one end and open to full diameter at the opposite end, a barrel shaped fluid control rotor rotatable within said bore and having a relatively thin cylindrical wall, one end of said rotor having a head and operating means on the head and the other end being open and in assembly within the body opening otward the open end of said bore, a closure secured within said open end of the bore and also closing the open end of the rotor, means for sealing all joints between said rotor and the body and between said closure and the body and the rotor, said closure comprising a disk slidably engaged within said open end of the bore, said bore having an annular groove in its wall closely adjacent the open end, and a retaining ring seated in said groove and holding the disk in place.

16. In combination in a valve structure of the character described, a valve body, a rotor operable in said valve body, said valve body having a fluid passage opening toward the rotor, a port in the rotor registerable with the passage, means for effecting a seal between the rotor and said passage including a ring of sealing material of resilient character, said port having grid bar means thereacross extending in the direction of rotation and having the outer edge thereof formed on the radius of the rotor and adapted to hold the sealing ring against entering the port upon movement of the port past the sealing ring in rotation of the rotor.

CLYDE A. BROWN.

REFERENCES CITED

The following references are of record in the file of this patent:

UNITED STATES PATENTS

| Number | Name | Date |
|---|---|---|
| 1,048,635 | Allerding | Dec. 31, 1912 |
| 1,914,719 | Hehemann | June 20, 1933 |
| 2,274,731 | Parker | Mar. 3, 1942 |
| 2,383,983 | Melichar | Sept. 4, 1945 |
| 2,529,412 | Parker | Nov. 7, 1950 |